Figures 1, 3:
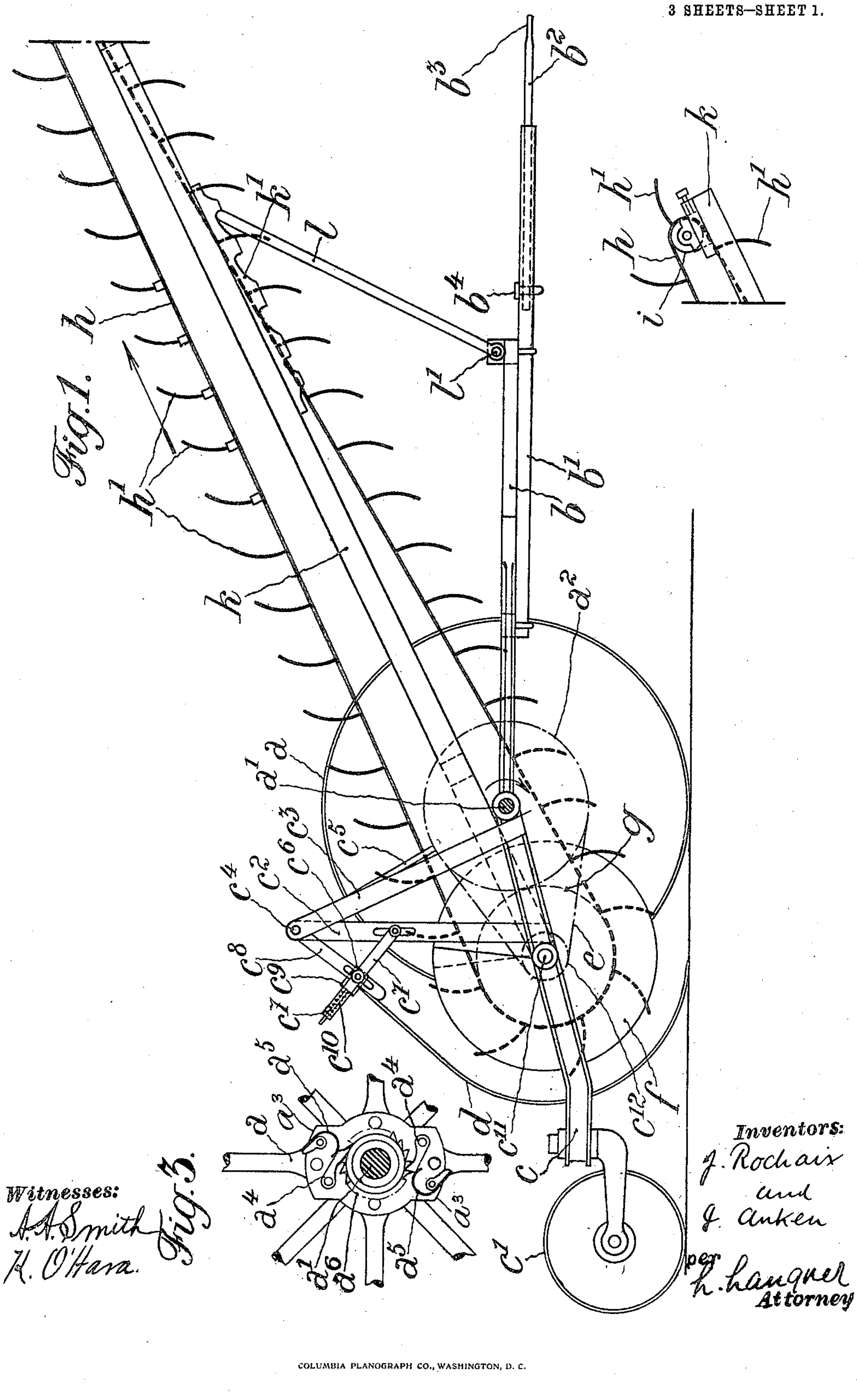

J. ROCHAIX & I. ANKEN.

MACHINE FOR RAKING AND LOADING MATERIALS SUCH AS HAY AND THE LIKE.

APPLICATION FILED AUG. 23, 1911.

1,076,452. Patented Oct. 21, 1913.

3 SHEETS—SHEET 1.

Witnesses:
A. A. Smith
H. O'Hara.

Inventors:
J. Rochaix
and
J. Anken
per R. Langner
Attorney

COLUMBIA PLANOGRAPH CO., WASHINGTON, D. C.

J. ROCHAIX & I. ANKEN.

MACHINE FOR RAKING AND LOADING MATERIALS SUCH AS HAY AND THE LIKE.

APPLICATION FILED AUG. 23, 1911.

1,076,452. Patented Oct. 21, 1913.

3 SHEETS—SHEET 2.

Witnesses:
A. A. Smith
K. O'Hara.

Inventors:
J. Rochaix & I. Anken
per
Lawrence Langner.
Attorney.

COLUMBIA PLANOGRAPH CO., WASHINGTON, D. C.

J. ROCHAIX & I. ANKEN.
MACHINE FOR RAKING AND LOADING MATERIALS SUCH AS HAY AND THE LIKE.
APPLICATION FILED AUG. 23, 1911.
1,076,452.
Patented Oct. 21, 1913.
3 SHEETS—SHEET 3.
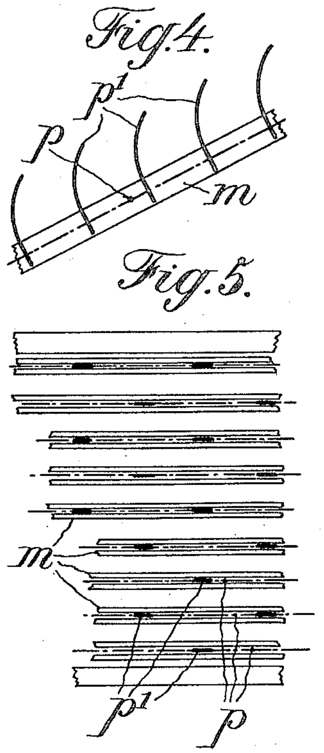
Fig. 4. Fig. 5.
Fig. 6.
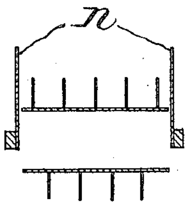
Fig. 8.
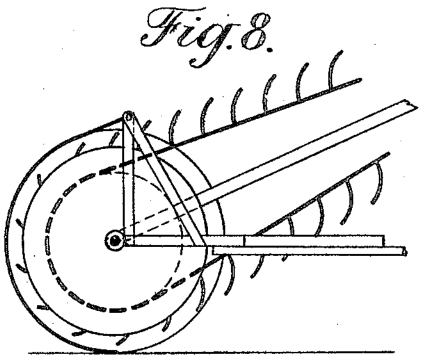
Fig. 7.
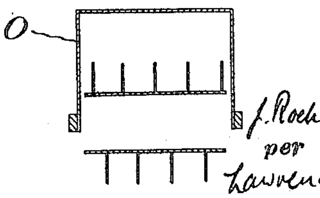
Witnesses:
A. A. Smith
K. O'Hara.
Inventors:
J. Rochaix & I. Anken
per Lawrence Langner
Attorney.
COLUMBIA PLANOGRAPH CO., WASHINGTON, D. C.

UNITED STATES PATENT OFFICE.

JOHN ROCHAIX, OF PETIT-SACONNEX, NEAR GENEVA, AND ISAAC ANKEN, OF ANIÈRES, NEAR GENEVA, SWITZERLAND.

MACHINE FOR RAKING AND LOADING MATERIALS SUCH AS HAY AND THE LIKE.

1,076,452. Specification of Letters Patent. Patented Oct. 21, 1913.

Application filed August 23, 1911. Serial No. 645,655.

*To all whom it may concern:*

Be it known that we, JOHN ROCHAIX and ISAAC ANKEN, agricultural engineers, both citizens of Switzerland, residing the first at Petit-Saconnex, near Geneva, the second at Anières, near Geneva, Switzerland, have invented certain new and useful Improvements in Machines for Raking and Loading Materials Such as Hay and the like, of which the following is a specification.

The present invention relates to a machine for raking material such as hay and the like and for loading the same upon vehicles. This machine is adapted to be attached behind the vehicle onto which the hay or the like is to be loaded; as the vehicle moves forward the machine rakes up the hay or the like from the ground and loads it onto the vehicle. This machine is preferably provided with a rake the teeth of which are pivoted on a horizontal shaft carried by two wheels which are arranged on a frame. This frame is adapted to be fixed behind the hay-car. The rake of the machine is combined with an endless conveyer which runs over a roller rotated when the machine moves forward. This roller is arranged concentric with the curved parts of the rake teeth. The endless conveyer is provided with prongs which catch the hay as it is collected in the middle of the rake and carry it over the vehicle to be loaded.

In order to increase the effective working width of the machine, the latter is provided with rotating bladed devices which are driven by the movement of the machine, and serve to shift the hay collected at the sides of the rake to the middle of the same.

The drawing accompanying this specification illustrates certain embodiments of the present invention and several details thereof. In this drawing like reference letters refer to like parts throughout.

Figure 2:
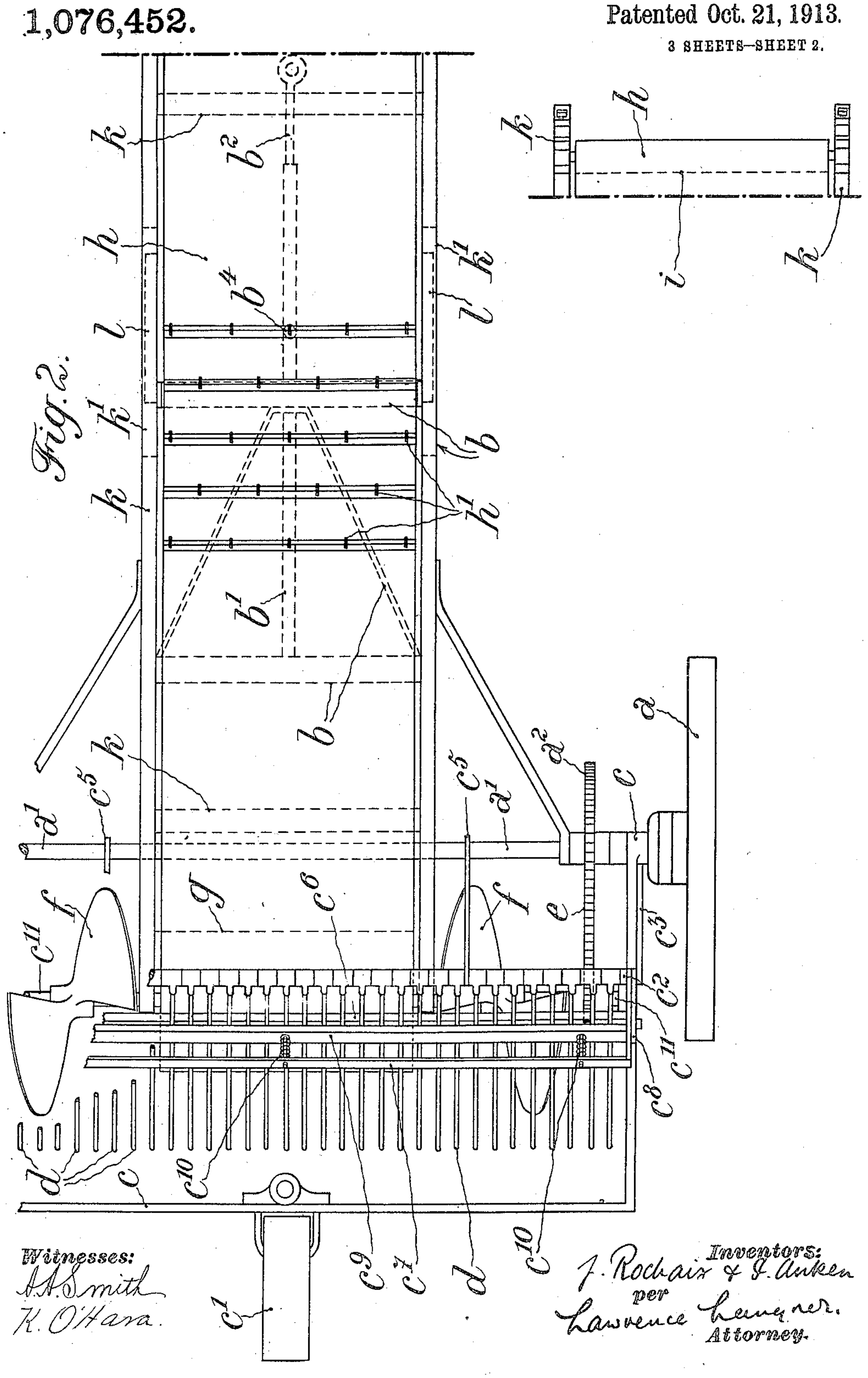

Figure 1 is a side view, and Fig. 2 a plan of one embodiment. Fig. 3 shows a detail of the machine; Figs. 4 to 7 are detail views of several modifications of the conveyer. Fig. 8 illustrates another embodiment.

In the drawing $a$ designates two wheels which are mounted on the ends of a horizontal axle $a^1$ which supports one end of a frame $b$. The latter carries an elongated sleeve $b^1$ in which the shaft $b^2$ can slide this shaft being provided at its free end with a ring $b^3$ adapted to be connected with a corresponding hook which is placed at the back of the vehicle on which the hay or the like is to be loaded. The shaft $b^2$ is maintained in the sleeve $b^1$ by means of a bolt $b^4$ which is arranged in holes formed in the shaft and the sleeve and which permits of regulating the distance between the ring and axle $a^1$, and therefore the position of the machine with relation to the vehicle. The ring $b^3$ might be replaced by a hook or by any other suitable means serving to connect the machine with the back of the vehicle. On the axle $a^1$ one of the ends of a second frame $c$ is mounted, this frame being provided at its rear with a wheel $c^1$ which is mounted in a supporting yoke adapted to pivot on a vertical axis. On each side of the frame $c$ are arranged two supports $c^2$, $c^3$, which carry at their upper ends a horizontal shaft $c^4$ on which are arranged the teeth $d$ of the rake. Bars $c^5$ connect the shaft $c^4$ with the axle $a^1$ in order to stay the shaft $c^4$. The teeth $d$ rest upon a cross-bar $c^6$ (Figs. 1 and 2) the screw-threaded ends of which extend through a stirrup $c^7$, one on each side and are each provided with a screw-nut. The ends of the stirrup $c^7$ are secured on the supports $c^2$ by means of bolts passing through slots in the supports $c^2$. The ends of the cross-bar $c^6$ pass through slots in the bars $c^8$ which are carried by the shaft $c^4$. These ends are screw-threaded and provided with nuts which maintain the stirrup $c^7$ in required position. A cross-bar $c^9$ is arranged between the sides of the stirrups, which bar is pressed by springs $c^{10}$ so as to tend to maintain the teeth of the rake in their normal position. The frame $c$ carries a shaft $c^{11}$ which is parallel to the axle $a^1$ and is connected with the same by means of a chain $e$ which passes over a sprocket $c^{12}$ carried by the shaft $c^{11}$ and over a sprocket $a^2$ on the axle $a^1$. On the shaft $c^{11}$ two propeller-like sets of blades $f$ are mounted, which when the machine is being dragged behind a vehicle shift the hay which has been collected by the teeth $d$ at the sides of the rake toward the center of the rake. Between the blades $f$ is provided a roller $g$ mounted on the shaft $c^{11}$ upon which roller runs an endless belt $h$. The latter passes over a second roller $i$ of relatively small diameter carried by a frame $k$ provided at one of its ends with bushes mounted on the shaft $c^{11}$. The front end of the frame $k$ is supported at a height which may be regulated to suit the convenience of the user by means of bars $l$ which are pivoted at $l^1$ on the frame $b$, and the upper ends of which enter notches in the bars $k^1$ secured to the frame $k$. The endless belt $h$ is provided with bent prongs $h^1$. The wheels $a$ are freely mounted on the axle $a^1$ and are each connected with a plate $a^3$ (see Fig. 3) carrying pawls $a^4$ The latter are maintained in engagement with ratchets $a^6$ by means of springs $a^5$, the ratchets being mounted on the axle $a^1$ in such manner that said axle will be rotated in the direction of the arrow (Fig. 1) when the machine is dragged behind a vehicle.

In operation, the machine is first coupled by its ring $b^3$ to the rear end of a vehicle, the position of the shaft $b^2$ and of the frame $k$ being regulated in order that the roller $i$ may be positioned above that part of the vehicle into which the hay or the like is to be dumped. The vehicle is then moved over the field, where the hay to be loaded lies in parallel lines or is spread over the entire surface of the field. The hay which is collected by the side teeth of the rake is shifted to the center thereof by the blades $f$ and there it is caught, together with the hay collected by the center teeth of the rake, by the prongs $h^1$ of the endless belt, which convey the hay over the part of the vehicle where it is to be dumped, and where it is equally distributed by a laborer on the vehicle.

Owing to the use of the blades $f$, the surface over which the machine is moved will be completely raked, and all the hay which was distributed over a relatively wide area is collected and loaded onto the hay car, whereby the cost of labor is much reduced.

For conveying the machine to the place where it is to be used, or from the place where it has been used to another place, the rake may be provided with means for raising its teeth. This is not shown in the drawing as any known type of device may be employed for this purpose.

To facilitate the transport of the machine, the frame $k$ may be removed from the shaft $c^{11}$ and the machine may be placed on a car or wagon, so that the axle $a^1$ and shaft $c^{11}$ can be positioned longitudinally of the car or wagon, to avoid the difficulty of handling so wide a machine in transport.

Instead of a single convolution as shown in the drawing, the blades $f$ could also comprise a plurality of convolutions in order to increase the effective working width of the machine.

As shown in Figs. 4 and 5, the conveyer may be made of endless ropes or cables $p$ which are provided with prongs $p^1$ and which are arranged between supports $m$ upon which the hay can slide as it moves up the conveyer. The conveyer can be arranged in any other suitable manner. As shown in Fig. 6, it may be provided with side flanges $n$ or, as shown in Fig. 7, with a cover $o$, which covers the passage way for the hay and prevents the wind blowing the hay off the conveyer.

The roller of the belt-conveyer, and the blades $f$ instead of being arranged on a second shaft as shown in Figs. 1 to 3, can be arranged directly on the road wheel axle as shown in Fig. 8.

The frames transporting members and the actuating mechanism of the machine can be made in any other suitable manner without departing from the spirit of our invention.

Having now particularly described and ascertained the nature of our said invention and in what manner the same is to be performed, we declare that what we claim is:—

1. A machine for raking and loading materials comprising in combination, a shaft, driving means therefor, a conveyer roller mounted on said shaft and adapted to rotate therewith, two rotatable screw conveyers, a rake disposed transversely to the direction of movement of the machine and extending from substantially the outer end of one screw conveyer to substantially the outer end of the other screw conveyer, said screw conveyers being mounted on said shaft and disposed one at each side of said roller for conveying the material from the ends of the rake toward the center thereof, and a conveyer arranged over the said conveyer roller for conveying the material from the central portion of the rake.

2. A machine for raking and loading materials comprising in combination, a shaft disposed perpendicular to the path of movement of the machine, road wheels, an axle therefor parallel with said shaft, driving means between said axle and said shaft, a conveyer roller mounted on said shaft and caused to rotate therewith, a rotatable propeller-like blade mounted on said shaft on each side of said conveyer roller for conveying the material from the ends of the rake toward the center thereof, a rake extending to substantially the outer ends of said blades, and an endless conveyer running over said conveyer roller for conveying the material from the center of the rake to the place of delivery.

3. In a machine for raking and loading materials, a plurality of screw members, means for rotating said screw members, a rake located transversely to the direction of movement of the machine for feeding the material to said screw members, said screw members in rotating acting to convey the material from the ends of the rake to the central portion thereof, and means for conveying the material from the central portion of the rake.

In testimony whereof we have affixed our signatures in presence of two witnesses.

JOHN ROCHAIX.
ISAAC ANKEN.

Witnesses:
ROD. DE WURTEMBERGE,
LOUIS H. MUNIER.

Copies of this patent may be obtained for five cents each, by addressing the "Commissioner of Patents, Washington, D. C."